April 25, 1961  R. W. ROE  2,981,537
SELF-DAMPING TORSILASTIC SUSPENSION
Filed Dec. 14, 1959
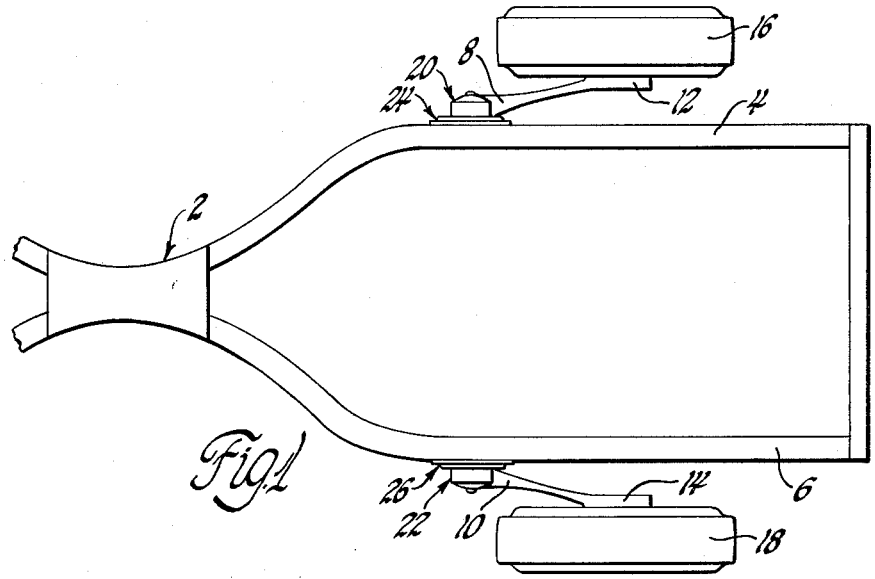
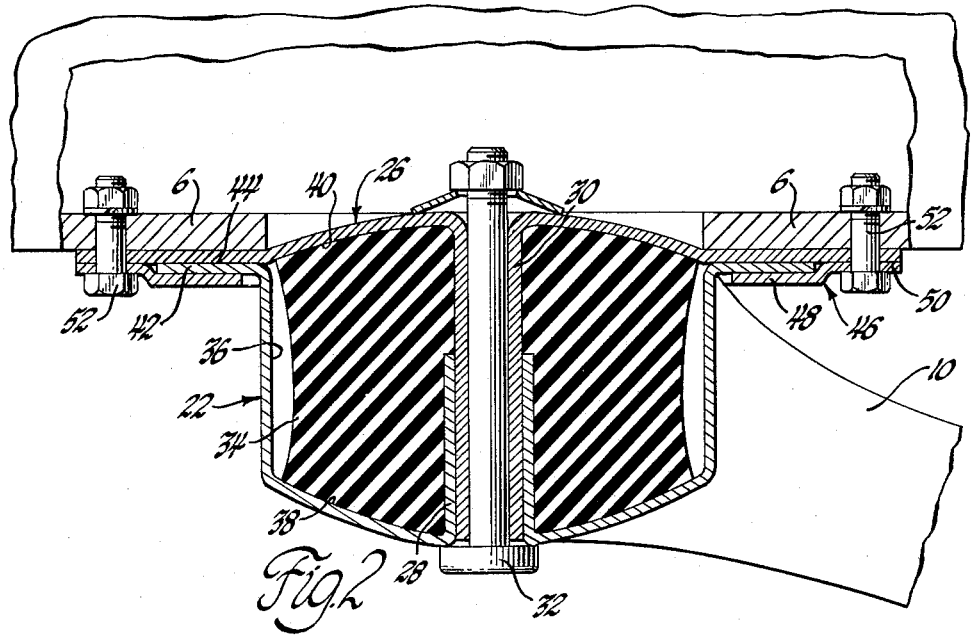
INVENTOR.
Ronald W. Roe
BY
W. F. Wagner
ATTORNEY United States Patent Office 2,981,537
Patented Apr. 25, 1961

2,981,537

SELF-DAMPING TORSILASTIC SUSPENSION

Ronald W. Roe, Birmingham, Mich., assignor to General Motors Corporation, Detroit, Mich., a corporation of Delaware Filed Dec. 14, 1959, Ser. No. 859,259

3 Claims. (Cl. 267—57.1)

This invention relates to vehicle suspension and the like and more particularly to torsilastic spring construction.

An object of the invention is to provide an improved torsilastic spring.

A further object is to provide a self-damping torsilastic suspension structure.

Another object is to provide a vehicle suspension wherein a vertically swingable wheel control arm is pivotally mounted on the sprung mass of the vehicle and elastic support of the sprung mass is accomplished by torsionally deflecting a rubber body disposed between the wheel control arm and sprung mass, the control arm and sprung mass having axially abutting friction surfaces, the rubber body being connected to the arm and sprung mass in such a way that torsional loading thereof produces an axial component of thrust on each member causing the friction surfaces to engage each other with progressively increasing pressure upon deflection of the control arm in either direction from a predetermined normal angular position.

A still further object is to provide a structure of the stated character which is simple in construction, low in cost, and efficient in operation.

These and other objects, advantages, and features of the invention will become more fully apparent as reference is had to the accompanying specification and drawings wherein:

Fig. 1 illustrates a portion of a vehicle chassis incorporating spring suspension in accordance with the invention; and Fig. 2 is an enlarged fragmentary view, partly in section and with parts broken away, illustrating the form and arrangement of the spring construction utilized in the suspension illustrated in Fig. 1.

Referring now to the drawings and more particularly to Fig. 1, there is shown a portion of a vehicle chassis wherein the reference numeral 2 designates generally the frame portion of the vehicle sprung mass. Mounted at lateral opposite sides of frame 2 and connected respectively to the side rails 4 and 6 thereof are a pair of trailing arms or longitudinal lever type wheel control arms 8 and 10. At their rearward ends, arms 8 and 10 are provided with hub portions 12 and 14 upon which are rotatably mounted wheels 16 and 18. It will be understood that wheels 16 and 18 may be either driven or nondriven, as desired. At their forward ends, arms 8 and 10 are provided with cup-shaped hub portions 20 and 22 which are disposed in concentric relation with and rotatably mounted on circular supports 24 and 26. Supports 24 and 26, in turn, are rigidly secured to frame side rails 4 and 6.

Since the details of spring construction associated with both control arms are identical, the following description of the parts associated with arm 10 will be understood to apply equally to those of arm 8.

As seen best in Fig. 2, hub portion 22 includes a central transversely inwardly directed tubular pilot portion 28 which surroundingly embraces an outwardly extending tubular pilot portion 30 formed integrally on support 26. A bolt 32 extends through tubular portions 28 and 30 and maintains hub 22 and support 26 in assembled relation.

In accordance with one feature of the invention, elastic support of the vehicle sprung mass relative to wheel 18 is accomplished by interposing an annular rubber body 34 in the cavity 36 defined by the interior of hub portion 22. Rubber body 34 is permanently secured, as by bonding, to the axially inwardly facing surface 38 of hub 22 and the axially outwardly facing surface 40 of support 26, with the result that upon vertical deflection of control arm 10 in either direction from a predetermined normal horizontal position, the rubber body is torsionally loaded or proportional to the relative angular movement occurring between the inwardly facing surface 38 and outwardly facing surface 40.

According to another feature of the invention, the portion of hub 22 adjacent support 26 is formed with a radially extending circumferential flange 42 which provides bearing engagement with a radially intermediate annular surface portion 42 of support 26. Surrounding and overlapping flange 42 is an annular plate 46 which serves to maintain flange 42 in uniform bearing engagement with surface 44 and prevent entrance of foreign matter between the bearing surfaces. Plate 46 is formed with a radially inward portion 48 providing bearing engagement with flange 42 and a laterally stepped radially outward portion 50 which is fixedly secured to frame side rail 6 coincidentally with support 26 by bolts 52. The lateral offset of portion 50 is preferably such that the space between inner portion 48 and support 26 is equal to the thickness of flange 42.

In operation, the suspension structure described operates as follows. Assume that control arm 10 is initially in an angular position such that no torsional loading is imposed upon annular rubber mass 34. Under these circumstances, rubber mass 34 will exert no axial component of thrust on either support 26 or hub 22 with the result that flange 42 exerts no frictional pressure on surface 44 of support 26. However, upon deflection of arm 10 in either direction, the attendant torsional wind-up of rubber mass 34 causes a progressively increasing axial component of thrust to be exerted on hub 22 with the result that flange 42 is urged laterally inwardly against support surface 44. This lateral inward movement results in progressively increasing frictional engagement between flange 42 and the adjacent surface 44 which provides frictional damping in direct proportion to the magnitude of control arm deflection. Naturally, as the control arm returns to its normal angular position, lateral pressure between flange 42 and surface 44 decreases. It will be understood that flange 42 may either be formed of, or have applied thereto, a suitable frictional material.

From the foregoing it will be seen that a novel and improved suspension spring construction has been provided. It is to be particularly noted that the damping function provided by the described construction increases proportional to magnitude of control arm deflection.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In combination, a support having a disc-shaped outer portion and a central tubular journal portion, a cup-shaped hub spaced axially from said disc-shaped portion and rotatably mounted on said journal portion, an annular rubber body disposed in the cavity defined by said hub, and flange means forming a circumferential bearing surface on said hub parallel with and axially abutting the surface of said disc-shaped outer portion, said rubber body having its axially opposite ends bonded to said disc-shaped outer portion and the end wall of said hub, respectively, so that rotation of said hub relative to said journal portion causes progressively increasing torsional loading of said body which induces an axial component of thrust on said hub urging said bearing surface into progressively increasing frictional engagement with said disc-shaped outer portion.

2. The structure set forth in claim 1 including an annular ring surrounding and overlapping said flange means, said ring being rigidly attached to said support.

3. The structure set forth in claim 2 wherein said ring is radially stepped in cross section with the step being equal to the thickness of said flange.

References Cited in the file of this patent

UNITED STATES PATENTS

| | | |
|---|---|---|
| 2,171,149 | Schroter et al. | Aug. 29, 1939 |
| 2,231,037 | Taylor | Feb. 11, 1941 |
| 2,380,191 | Sauzedde | July 10, 1945 |